US008745061B2

(12) United States Patent  
Austermann

(10) Patent No.: US 8,745,061 B2  
(45) Date of Patent: Jun. 3, 2014

(54) SUFFIX ARRAY CANDIDATE SELECTION AND INDEX DATA STRUCTURE

(75) Inventor: Patrick Austermann, Princeton, NJ (US)

(73) Assignee: TIBCO Software Inc., Palo Alto, CA (US)

( * ) Notice: Subject to any disclaimer, the term of this patent is extended or adjusted under 35 U.S.C. 154(b) by 146 days.

(21) Appl. No.: 13/173,345

(22) Filed: Jun. 30, 2011

(65) Prior Publication Data

US 2012/0117076 A1 May 10, 2012

Related U.S. Application Data

(60) Provisional application No. 61/411,847, filed on Nov. 9, 2010.

(51) Int. Cl.
G06F 17/30 (2006.01)
(52) U.S. Cl.
CPC .................. G06F 17/30672 (2013.01)
USPC .......................................... 707/741; 707/765
(58) Field of Classification Search
CPC ..................................................... G06F 17/276
USPC ..................... 707/709, 706, 723, 673
See application file for complete search history.

(56) References Cited

U.S. PATENT DOCUMENTS

| 5,220,622 | A  | * | 6/1993  | Scarr .............................. 382/210 |
| 6,141,655 | A  |   | 10/2000 | Johnson et al. |
| 7,089,545 | B2 | * | 8/2006  | Bera .............................. 717/160 |
| 7,818,316 | B2 | * | 10/2010 | Moore et al. .................. 707/723 |
| 7,996,369 | B2 | * | 8/2011  | Li et al. .......................... 707/673 |
| 8,244,065 | B2 | * | 8/2012  | Narukawa ...................... 382/284 |
| 8,332,380 | B2 | * | 12/2012 | Moore et al. .................. 707/706 |
| 2002/0087510 | A1 | * | 7/2002  | Weinberg et al. ................. 707/1 |
| 2004/0030695 | A1 | * | 2/2004  | Lyudovyk et al. ................ 707/6 |
| 2004/0117781 | A1 | * | 6/2004  | Bera .............................. 717/160 |
| 2006/0218170 | A1 | * | 9/2006  | Livshits ........................ 707/101 |
| 2006/0265208 | A1 | * | 11/2006 | Assadollahi ...................... 704/9 |
| 2007/0050384 | A1 | * | 3/2007  | Whang et al. ................. 707/100 |
| 2007/0083495 | A1 | * | 4/2007  | Dettinger et al. ................ 707/3 |
| 2008/0072143 | A1 | * | 3/2008  | Assadollahi ................... 715/261 |
| 2008/0147607 | A1 | * | 6/2008  | Moore et al. ...................... 707/3 |
| 2008/0151293 | A1 | * | 6/2008  | Narukawa .................... 358/1.15 |
| 2010/0125594 | A1 | * | 5/2010  | Li et al. .......................... 707/758 |
| 2011/0040742 | A1 | * | 2/2011  | Moore et al. .................. 707/709 |
| 2011/0179013 | A1 | * | 7/2011  | Jiang et al. ..................... 707/711 |
| 2012/0166182 | A1 | * | 6/2012  | Ko et al. ........................... 704/9 |

OTHER PUBLICATIONS

PCT/US2011/059940, International Search Report and Written Opinion mailed Apr. 30, 2012.

* cited by examiner

Primary Examiner — Sherief Badawi  
Assistant Examiner — Jesse P Frumkin  
(74) Attorney, Agent, or Firm — Baker & McKenzie LLP

(57) ABSTRACT

A method and system for identifying a candidate subset of a data set comprises comparing suffixes of query field values to data field values of records in the data set. Sufficiently similar records are included in the candidate subset. Query field value suffixes may range in length from the query field value itself down to a minimum suffix length. The longest suffix may be processed first, and then successively shorter suffixes may be processed until a satisfactory number of candidates are identified. Entries in an index data structure derived from the data set may associate various suffixes found in the data set with individual records. The data structure entries may include record keys identifying records with data field values identical to the suffix and may also include suffix pointers identifying related data structure entries with suffixes similar to the entry's suffix.

45 Claims, 5 Drawing Sheets

SUFFIX ARRAY CANDIDATE SELECTION AND INDEX DATA STRUCTURE

CROSS REFERENCE TO RELATED APPLICATIONS

This application relates and claims priority to U.S. Provisional Patent Application No. 61/411,847 entitled "Suffix array candidate selection and index data structure" filed Nov. 9, 2010, which is herein incorporated by reference.

TECHNICAL FIELD

The disclosed embodiments relate generally to candidate selection for exact and inexact matching via the use of generalized suffix arrays in the context of querying structured and semi-structured data.

BACKGROUND

Accurately determining similarity between records may be computationally expensive when trying to find exact and inexact matches to a query in a large table. Traditionally B-Trees, hashes, and inverted indexes of values or fields may be used (so-called "blocking strategies") to find candidate matches. These matches may be refined in later processing stages using more precise methods.

Hashes or keys may be any value computed from a given record. For example, the first letter of the first name, followed by the first letter of the last name, and the last four digits of the social security number may be a hash or key value. Another example may be to use SOUNDEX codes (phonetic algorithms for indexing names by a representation of their sound) of data fields or cryptographic hashes (to preserve confidentiality in the processing of matches). A system based on such hashes or keys may be limited in that only similarity patterns covered by the keys that were explicitly chosen by the system designer or user are considered. Real-world data variations that do not follow these patterns are at risk of being missed. This may lead to false negatives (missed matches) and may be unacceptable for many queries. Further, it may be difficult to find a good key of the data, for example when dealing with complex product descriptions.

B-Trees and other tree-based data structures allow range queries and may find the longest prefix match between the query and the records. But finding only a prefix match may exhibit many of the same issues as match keys, for example, false negatives may be a risk and may be unacceptable for many queries.

Inverted indexes are full text indices that may use a list of all tokens which occur in the data along with the locations of token occurrence(s). This method may often be used for finding text documents or emails but may also be applied to structured data. This approach may lead to missed matches when the data and query are not tokenized identically, are split across fields, or merged from fields. Examples include dissimilar data fielding between query and record, and foreign names which can be hard to tokenize and field in a table that was designed for western names (e.g., AbuAli al-Husayn ibnSina, xiaolongqui).

SUMMARY

Disclosed herein are various embodiments of a system and method for identifying a candidate subset of a data set. The data set may comprise a plurality of records structured with a data field, and each record's data field may comprise a data field value. The data field value may comprise a sequence of one or more unigrams. Embodiments may include recognizing a query field value and performing the steps of a candidate generation iterative loop. In some embodiments, the identified candidate subset may be delivered to a filter process that identifies a filtered subset of the candidate subset.

In some embodiments, the iterative loop may include (1) identifying a query field value suffix, (2) identifying a qualifying subset of the data set with records containing data fields that are sufficiently similar to the query field value suffix, (3) including the identified qualifying subset records in the candidate subset, and (4) repeating the iterative loop with a new query field value suffix. The iterative loop may repeat until a satisfactory number of candidates are found. In the first iteration, the query field value suffix may be identical to the query field value.

In some embodiments, identifying the query field value suffix may involve generating it; in other embodiments, identifying the query field value suffix may involve selecting it from a set of eligible suffixes. A set of eligible suffixes may be generated by performing a suffix generation iterative loop. In some embodiments the suffix generation iterative loop may include (1) generating a suffix of the query field value, (2) including the generated suffix in the set of eligible query field value suffixes, and (3) repeating the loop until all eligible suffixes are generated. In some embodiments, the first generated suffix is identical to the query field value.

In some embodiments, the data field value of each qualifying subset record may be a sequence of unigrams identical to the query field value suffix. In some embodiments, the data field value of each qualifying subset record may be a sequence of unigrams similar, but not identical, to the query field value suffix. In such embodiments the data field value may be associated with or assigned a similarity score when compared to the query field value suffix, and the similarity score may satisfy a minimum similarity score criterion.

In some embodiments, identifying the qualifying subset of the data set may involve accessing an index data structure derived from the data set. The index data structure may include entries containing a unigram sequence and associating the unigram sequence with data set records. Records associated with entries satisfying an index entry similarity criterion when compared to the query field value suffix may be included in the qualifying subset of the data set.

A disclosed system and method for identifying a candidate subset of a data set may include recognizing a plurality of query field value and performing the steps of a candidate generation iterative loop. In some embodiments, the identified candidate subset may be delivered to a filter process that identifies a filtered subset of the candidate subset.

In some embodiments, the iterative loop may include (1) identifying a query field value suffix for each query field value, (2) identifying a qualifying subset of the data set with records containing data fields that are sufficiently similar to the query field value suffixes, (3) determining a similarity score for each record in the qualifying subset, (4) identifying a threshold subset of the qualifying subset, where the similarity score satisfies a threshold value, (5) including the threshold subset records in the candidate subset, and (6) repeating the iterative loop with a new query field value suffixes. The iterative loop may repeat until a satisfactory number of candidates are found. In the first iteration, the query field value suffix may be identical to the query field value for each query field value.

Also disclosed are embodiments of an index data structure derived from a data set. The index data structure may be used in identifying a candidate subset of the data set. The index data structure may have an entry for each data field value suffix of each record's data field value, and an entry may include an index unigram sequence identical to the data field value suffix and record association data associating the index unigram sequence with qualifying data set records. Qualifying data set records may contain the index unigram sequence. In some embodiments, the index data structure may have an entry for each unique data field value suffix in the data set, and may be sorted by index unigram sequence.

In some embodiments, the record association data may include record keys and suffix pointers. Record keys may identify qualifying data set records where the record's data field value is identical to the index unigram sequence. Suffix pointers may identify a related entry in the index data structure, where the related entry's unigram sequence contains the entry's unigram sequence.

Disclosed embodiments of systems for identifying a candidate subset of a data set may include an index data structure and a candidate generator. Some embodiments may also include an index data structure generator for generating the index data structure. The index data structure may be stored on one or more memory elements and may be derived from the data set. Each entry in the index data structure may have an index unigram sequence and data associating the index unigram sequence with data set records.

The candidate generator may be implemented on one or more processors, and may be for recognizing a query field value and for performing iterations of a candidate generation iterative loop. In some embodiments, the candidate generator may also be for generating a set of eligible query field value suffixes, and may also be for delivering the candidate subset to a filter process.

In some embodiments, the candidate generator is also for modifying the recognized query field value prior to performing the first iteration of the candidate generation iterative loop. Modifying the recognized query field value may involve moving the first unigram to the end and shifting the sequence of unigrams to the left.

DETAILED DESCRIPTION

Figure 1A:
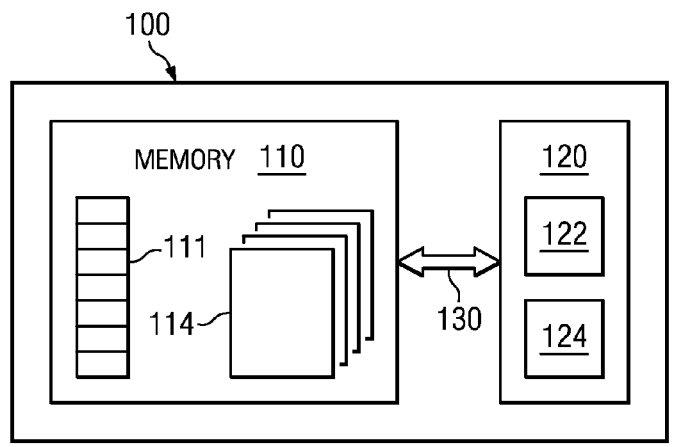
FIGS. 1A and 1B are schematic diagrams illustrating example systems for identifying a candidate subset of a structured or semi-structured data set, in accordance with the present disclosure.

Electronically stored information may be organized in a number of ways. Such electronic information may be stored in structured or partially structured tables or other data sets comprising records, and each record may be comprised of at least a record identifier field, such as a record key, and one or more data fields. For example, Department of Motor Vehicles (DMV) information may be stored in a data set with a record for each registered vehicle. In addition to an identifier field, such DMV records may have an owner data field, an owner address field, a VIN field, a vehicle model field, and/or any number of other appropriate data fields. Such a table of records may include hundreds, thousands, millions, or more individual records. Finding a particular record or group of records that satisfy particular search criteria can be computationally expensive and time-consuming.

Some approaches to searching large tables may utilize specialized index data structures that relate to data field values in the records. If the data field values comprise sequences of one or more unigrams (for example, strings), such specialized index data structures may include, for example, an inverted index of trigrams (substrings of three unigrams)—other gram lengths may be used—of all matchable data fields in the table. In other words, the index data structure may maintain, for every unique trigram in a field, a list of record keys that contain this trigram, also known as a gram vector. The index data structure may be kept in memory for real-time query performance.

Some approaches to searching large tables may also implement a process that may analyze a query, may determine which trigrams occur in the query and what their relative importance (weight) is, and then may traverse the gram vectors to identify the records with the largest sum of trigram scores. Such a process may scale approximately linearly in the size of the indexed dataset and the size of the query for large data sets, and may scale sub-linearly for smaller datasets, which is typical hash behavior when collisions are frequent.

Such search processes may work well in many cases in terms of accuracy and performance, yet may be limited in that virtually all gram vectors are traversed for any trigram the query shares with the data. See, e.g., U.S. Pat. No. 7,107,263 to Yianilos et al., which is herein incorporated by reference. Even when an exact or near exact match is found, all records, even those with the most distant matches, are also exhaustively considered. On large data sets, such a candidate selection algorithm may consume a significant amount of CPU resources for a query. Further, limitations to fixed length sub-grams may limit accuracy when many close matches exist because a constant length substring match limits contextual information for a match and therefore resolution may suffer. Such a search process might also miss some matches that would be found if using shorter grams.

Some approaches to searching large tables may implement a SORT prefilter. The SORT prefilter may use a set of sort keys to locate matching candidates that are passed to a subsequent filter stage. A search key may comprise a sequence of fields by which the list of records is sorted lexicographically. In addition to sorting lexicographically, the SORT filter may use the string written backwards as another search key.

The list of records sorted by a key may be stored in memory (as an array of record keys) and thus may allow a query to look up records that are closest to the query using a binary search on the sorted list. Then, a certain range of records (say, the 100 records closest to this position) may be passed on to the next stage. This may work with log(N) computational complexity. "Closest" here means the longest prefix match between the query and the record fields. When using the keys based on backwards record fields, it may find the longest suffix match instead.

For a typical database with 10 million records and 12 search keys, SORT may store 120 million record keys (32 bit integers). The limitation is that if there is neither a sufficient prefix or suffix match between record and query, a particular key may fail to locate the desired record. This limitation may be mostly overcome by using several keys so that at least one of them pushes the desired record(s) forward to the next filter stage.

If, instead of forwards and backwards keys, query field suffixes are used, substantially all substring matches between the M query field suffixes and the corresponding data field suffixes in the record may be located using M log(N*k) lookups per query field. In the preceding sentence, M represents the number of unigrams in the query field, k represents the average length of the record's corresponding data field (usually less than 10 on average for typical data sets), and N represents the number of records in the table. The sorted list of records would be longer (because every records' fields' suffix is stored, as opposed to just the value's forward and backwards entry) and an additional position into the field is added using 1-2 additional bytes, leading to a size increase by factor 3-8 (typical).

The advantage may be that the longest substring match is likely a much better approximation than a prefix and substring match only—but if the prefix or the suffix match is the longest, these will be included in the suffix-based results also because they are substrings, too.

Embodiments of systems, processes, and methods that may be accurate and efficient in finding query matches among the records of structured and/or semi-structured data sets are disclosed herein. The most similar matching records (for example those with the most and/or longest matching substrings) may be found first, and may be followed by matching records of decreasing degrees of similarity. Some embodiments may terminate early at a user-defined point. Thus, longer matching substrings may be considered, which may increase the accuracy of queries by considering more content.

Also disclosed herein are embodiments of data structures that may compactly represent a generalized suffix array for repetitive data. With these data structure embodiments, substring matches of virtually any length may be quickly calculated. Further, embodiments of these data structures may minimize memory usage in typical use cases. In some embodiments, a plain generalized suffix array may be used.

FIG. 1A is a schematic diagram illustrating an example system 100 for identifying a candidate subset of a structured or semi-structured data set. The system 100 may include a memory element 110 having an index data structure 111 and storage for a structured and/or semi-structured data set 114. In some embodiments, index data structure 111 and data set 114 may reside in the same memory element 110, and in other embodiments, index data structure 111 and data set 114 may reside in separate memory elements. In still other embodiments, one or both of the index data structure 111 and data set 114 may reside in multiple memory elements. The index data structure 111 may be used for storing unigram sequences, record keys, and/or other record association data associated with the data set 114. The system 100 may also include a processor 120. The processor 120 may include a candidate generator 122 that may use index data structure 111 to identify a candidate subset of data set 114 when processing a query of data set 114. The processor 120 may also include an index data structure generator 124 for populating the index data structure 111 based on the structured or semi-structured data set 114. The processor 120 may communicate with the memory element 110 via a communication bus or network 130.

Although only one processor 120 and a single memory element 110 is shown in the system 110, multiple processors 120 and multiple memory elements 110 may be used. The processor 120 and single memory element 110 are shown for simplicity purposes only. In an embodiment, a set of networked computing machines, in a networked computing environment, having shared processing capability and shared memory or storage may be used. In other embodiments, a single machine having multiple processors and/or multiple memory or storage elements may be used.

Figure 1B:
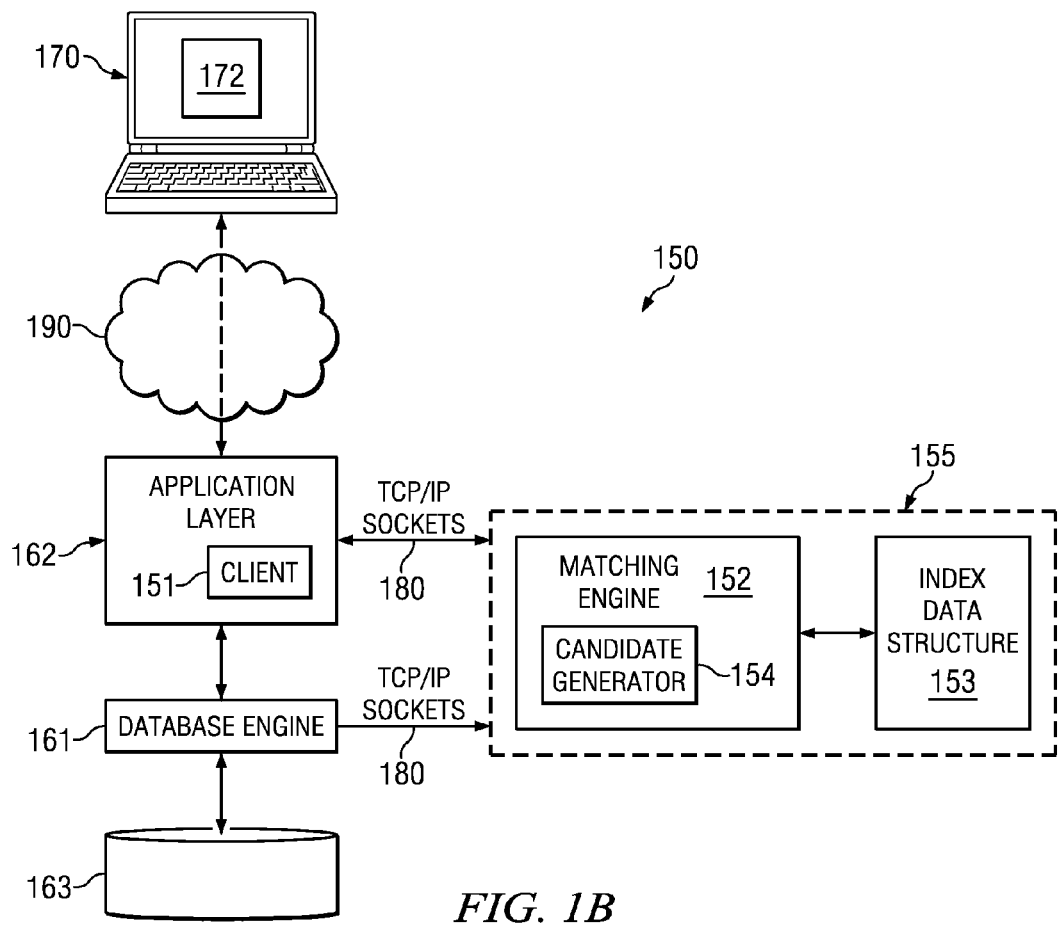

FIG. 1B is a schematic diagram illustrating an example system 150 for identifying a candidate subset of a structured or semi-structured data set. A user querying structured and/or semi-structured data may use a user machine 170 to execute a search of the data. The user machine 170 may include a browser window 172. In an embodiment, the browser window 172 may contain input fields to accept query terms from the user.

The user machine 170 may interact with an application layer of the system 150 via a network 190 (including, but not limited to, the internet or World Wide Web). The system 150 may include application layer 162 for accessing a matching engine 152. In an embodiment, the matching engine 152 may operate as an in-memory application in a layer 155.

The application layer 162 may be in communication with the matching engine 152 via TCP sockets, using a TCP client 151. In an embodiment the communication 180 may be achieved via TCP-IP socket communication.

In an embodiment, matching engine 152 may include a candidate generator 154, and may include an in-memory application in communication with any database engine 161. The database engine 161 may include, but is not limited to, Oracle, Microsoft SQL Server, IBM DB2, MySQL, etc. and may be in communication with a data storage element 163. The matching engine 152 may also be associated with and in communication with an in-memory index data structure 153.

At the client, the search function may be integrated into applications 162 via an API using common programming languages including, but not limited to, Java, .Net, Python, and C/C++. The candidate generator 154 may run on any platform including, but not limited to, Linux, Windows, and all major UNIX platforms. The candidate generator 154 may also be capable of providing sustained real-time, accurate search capabilities for various-sized databases 163.

In an embodiment, the matching engine 152 architecture may be such that search requests may be load balanced across application instances and partitioned to handle any size database 163 with minimal latency. Multi-threaded and federated queries may be handled by the matching engine 152, and may allow a wide range of server environments, data schema, and business application needs to be met.

In an embodiment, the matching engine 152 may use advanced mathematical modeling and bi-partite graph-based matching to calculate similarity scores. The matching engine 152 may be capable of processing large numbers of match calculations in short amounts of time on standard hardware. The matching engine 152 may find data elements similar to a query that strict SQL-type search and other types of fuzzy matching may not find. The matching engine 152 may be substantially agnostic as to the type of data or domain. The matching engine 152 may not need to know whether data contains name and address information, product information, medical records, or Chinese character information. In an embodiment, spoken languages may be intermixed. The matching engine 152 may allow for quick deployment substantially without prior knowledge of the type, structure, or state of the data due to its cultural and domain independence.

Figure 2:
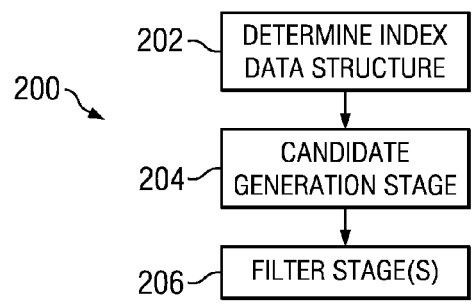
FIG. 2 is a flow diagram illustrating an example method for querying and filtering structured or semi-structured data, in accordance with the present disclosure.

FIG. 2 is flow diagram 200 illustrating an example method for querying and filtering structured or semi-structured data. At action 202, an index data structure may be determined based on the structured or semi-structured data set and, specifically, based on a plurality of records included in the structured or semi-structured data set. In some embodiments, an index data structure entry may include unigram sequences (for example, suffixes) associated with data set records, and may also include record association data. In some embodiments, the record association data may include record keys identifying which records are associated with the unigram sequence. In some embodiments, the record association data may include pointers to (or addresses of) data having information about suffix relationships, grams, and/or record keys associated with suffix vectors in the structured or semi-structured data. The index data structure may be determined initially, and then updated whenever records are added to, deleted from, and/or changed in the data set.

Whenever a data set is searched for a particular record or group of records that satisfy a query, an initial set of record candidates may be identified, and may be followed by refinement of the initial set of candidates. At action 204, a candidate generation stage may be executed. The candidate generation stage may include recognizing one or more query values, and may include accessing an index data structure to identify records in a structured or semi-structured data set that match the query value. Query values may comprise sequences of one or more unigrams. Records matching such query values may contain data fields, and the values in such data fields may also comprise sequences of one or more unigrams. Unigrams represent a unit of recognizable data, for example, in a data string. In some embodiments, unigrams may be graphemes such as alphabetic letters, alphanumeric characters, numerals, or Chinese characters, although unigrams may be any unit of data recognizable by the processing system.

The candidate generation stage may further include identifying a suffix of a given query value to identify records in a structured or semi-structured data set that match the suffix. For a query value (or any value) comprising a sequence of N unigrams, represented as $U_1 U_2 U_3 \ldots U_N$, a maximum of N suffixes may be identified: $U_1 U_2 U_3 \ldots U_N$ (suffix length N, the maximum possible length suffix, which is the data value itself); $U_2 U_3 \ldots U_N$ (suffix length N–1); $U_3 \ldots U_N$ (suffix length N–2); and $U_N$ (suffix length 1, the minimum possible length suffix).

In some embodiments, a similarity metric or other similarity criterion may be used to identify matching records. A similarity metric may be used to assign a similarity score to individual records. For example, if the full length of the given query value exactly matches a record's data field value, a similarity score of 1.0 may be assigned to that record; if no unigram of the given query value matches a record's data field value, a similarity score of 0.0 may be assigned to that record. Partial matches may fall in the range between 0.0 and 1.0.

In some embodiments, the candidate generation stage may employ an iterative process to identify a candidate subset of the set of records in the data set. In such embodiments, a first query value suffix may be identified and a qualifying subset of the record set that match the first query value suffix may be identified and added to the candidate subset. If a satisfactory number of candidate records have not yet been identified, a second query value suffix may be identified and a qualifying subset of the record set that match the second query value suffix may be identified and added to the candidate subset. Again, if a satisfactory number of candidate records have not yet been identified, a third query value suffix may be identified and a qualifying subset of the record set that match the third query value suffix may be identified and added to the candidate subset. This process may be repeated until a satisfactory number of candidate records have been identified, until all query value suffixes have been processed, until a predetermined number of query value suffixes have been processed, or until some other loop-ending criteria is satisfied.

In some embodiments, a candidate generation iterative loop may start with a long query value suffix, and may start with the query value itself. Successive interations may then use a shortened query value suffix, for example, a query value suffix one gram length shorter than the preceding query value suffix. This may be continued until a minimum gram length is used for the querying suffix or until a sufficient set of matches has been accumulated. By starting with the longest suffix first, the most relevant matches may be determined more quickly. When a sufficient number of matches are accumulated, the highest scoring records may be determined and passed to filtering stages. The candidate generation stage 204 is also discussed below in relation to FIG. 4.

At action 206, filtering stages may be performed on the candidate subset. In an embodiment, a first filtering stage produces records expected to score the highest out of the structured or semi-structured data set. In an embodiment, the first filtering stage may count the co-occurrence of variable length grams. In an embodiment, a subsequent filtering stage may employ a bipartite graph algorithm or other algorithm to generate scores that are returned to the user in the result set. In an embodiment, the second filtering stage may enhance the results by considering positional information of matching grams.

Figure 3:
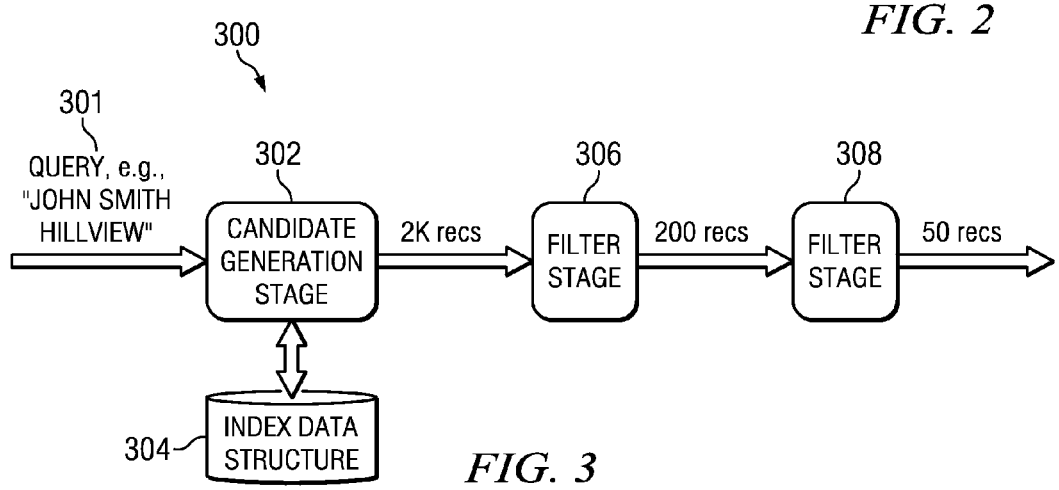
FIG. 3 is a schematic diagram illustrating an example process for querying and filtering structured or semi-structured data, in accordance with the present disclosure.

FIG. 3 is a schematic diagram illustrating an example process 300 for querying and filtering structured or semi-structured data. A query may be initiated 301 (e.g., "John Smith Hillview") over a structured and/or semi-structured data set. At a candidate generation stage 302, an index data structure 304 associated with the data set may be accessed to identify records in the data set that are similar (for example, exactly or inexactly match) a given query field. Results (e.g., 2000 records) from the candidate generation stage 302 may be passed to a first filter stage 306. The first filter stage 306 may produce and filter records expected to score the highest out of the data set. In an embodiment, the first filtering stage may count the co-occurrence of variable length grams. Results (e.g., 200 records) from the first filter stage 306 may be passed to a second filter stage 308. The second filter stage 308 may produce scores that are returned to the requestor in a result set. In an embodiment, the second filtering stage may enhance the results by considering positional information of matching grams.

Figure 4:
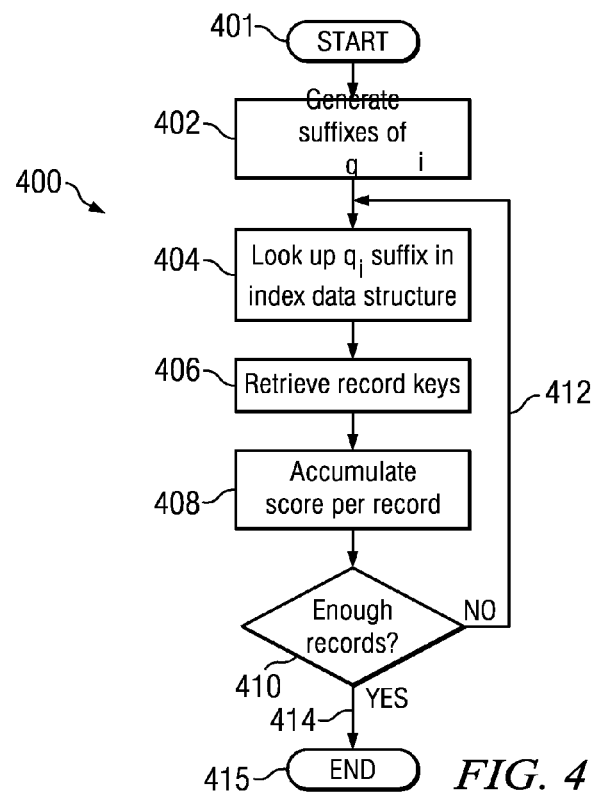
FIG. 4 is a flow diagram illustrating an example method for identifying a candidate subset of a structured or semi-structured data set, in accordance with the present disclosure.
Figure 4:
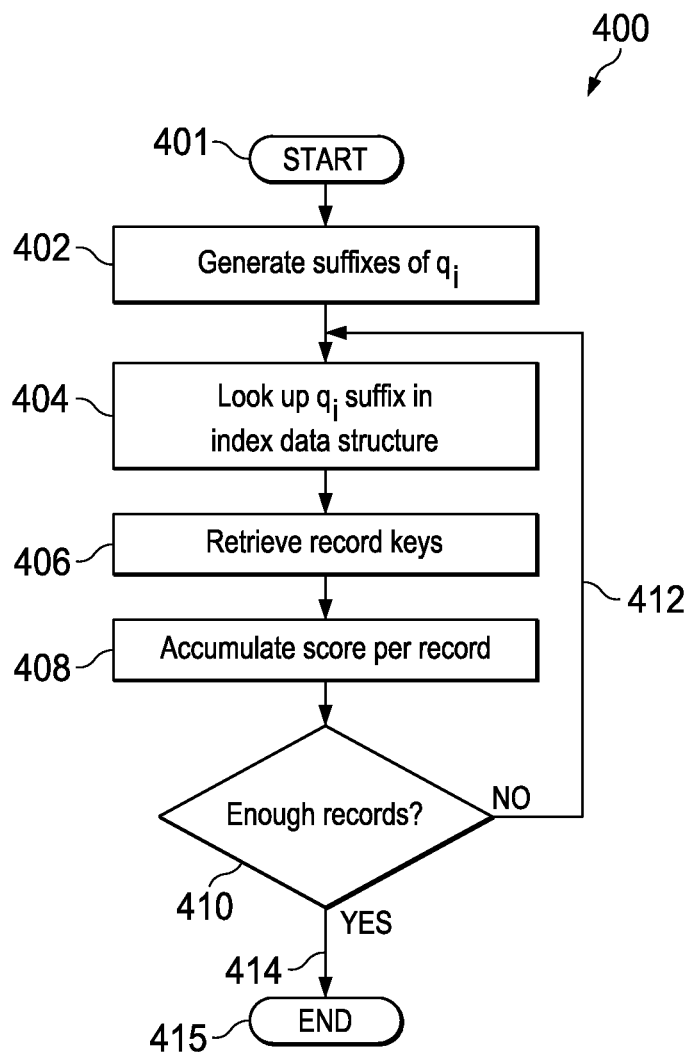

FIG. 4 is a flow diagram illustrating an example method 400 for identifying a candidate subset of a structured or semi-structured data set. The process starts at action 401. Assuming a given query over m fields, $Q=(q_1, q_2, q_{m-1}, q_m)$, all suffixes for every query field value $q_i$ may may be generated down to a minimum suffix length at action 402. An individual query field value $q_i$ may comprise a sequence of N unigrams beginning with $U_1$ and ending with $U_N$. A suffix of query field value $q_i$ may comprise a sequence of N–J unigrams beginning with $U_{1+J}$ and ending with $U_N$, where J symbolizes a non-negative integer value less than N. When J equals zero, the query field value suffix and the query field value are the same sequence of unigrams. For example, for Q=("WILHELM", "SMITH", "HILLVIEW") and for a minimum suffix length of three, the suffixes generated for the first query field value $q_1$ are WILHELM, ILHELM, LHELM, HELM, and ELM; the suffixes generated for the second query field value $q_2$ are SMITH, MITH, and ITH; and the suffixes generated for the third query field value $q_3$ are HILLVIEW, ILLVIEW, LLVIEW, LVIEW, VIEW, and IEW. In some embodiments, less than all possible suffixes may be generated for any or all of the query field values $q_i$.

At action 404, a given $q_i$ suffix (e.g., WILHELM) may be looked up in an index data structure derived from the data set. In some embodiments, the index data structure may associate unigram sequences with records in the data set. In some embodiments, the index data structure may be sorted by unigram sequence, and a binary search of the index data structure may take O(log(number of unique suffixes in the index data structure)) units of time. All entries in the index data structure that contain a unigram sequence matching the given $q_i$ suffix may thus be identified, for example via substring matching, and consequently the data set records associated with the matching unigram sequence are also identified. Thus, all records in the data set containing the given $q_i$ suffix anywhere may be identified. In an embodiment, a longer $q_i$ suffix is used first to access the index data structure. For example, for the query field value WILHELM, WILHELM itself is the longest $q_i$ suffix.

At action 406, record keys associated with the identified index data structure entries containing the given $q_i$ suffix may be retrieved. In some embodiments, the record keys may be located through record association data associated with the identified index data structure entries. Record association data may associate one or more record keys with the given $q_i$ suffix, and may identify which records in the data set contain data fields with a suffix that matches the given $q_i$ suffix. In some embodiments, record association data may include gram vectors. For example, the record association data for a given $q_i$ suffix may contain pointers to other entries in the index data structure, where the given $q_i$ suffix is itself a suffix of the other entries. This vector function is also discussed below in relation to FIG. 5.

At action 408, records in the structured or semi-structured data associated with the retrieved record keys may be analyzed to determine a score for each record. Scores may be determined in any predetermined way, for example by using a similarity metric that maps a match on the full length of the field to a 1.0 score down to a non-match to a 0.0 score. In some embodiments, action 408 may be performed only after action 414 or not at all.

At action 410, when a sufficient number of qualifying records have been found 414, the querying process ends at 415. A sufficient number may be set by a user, may be hard-coded within the querying algorithm, or may default to a pre-determined number (e.g., 2000 records). If a sufficient number have not been found 412, action 404 is performed again with a new $q_i$ suffix. In an embodiment, the new $q_i$ suffix has a shorter length (for example, one less unigram) than what was used in the previous step 404. For example, for the query field WILHELM, if WILHELM is the first $q_i$ suffix used, ILHELM may be used at the next action 404.

Figure 5:
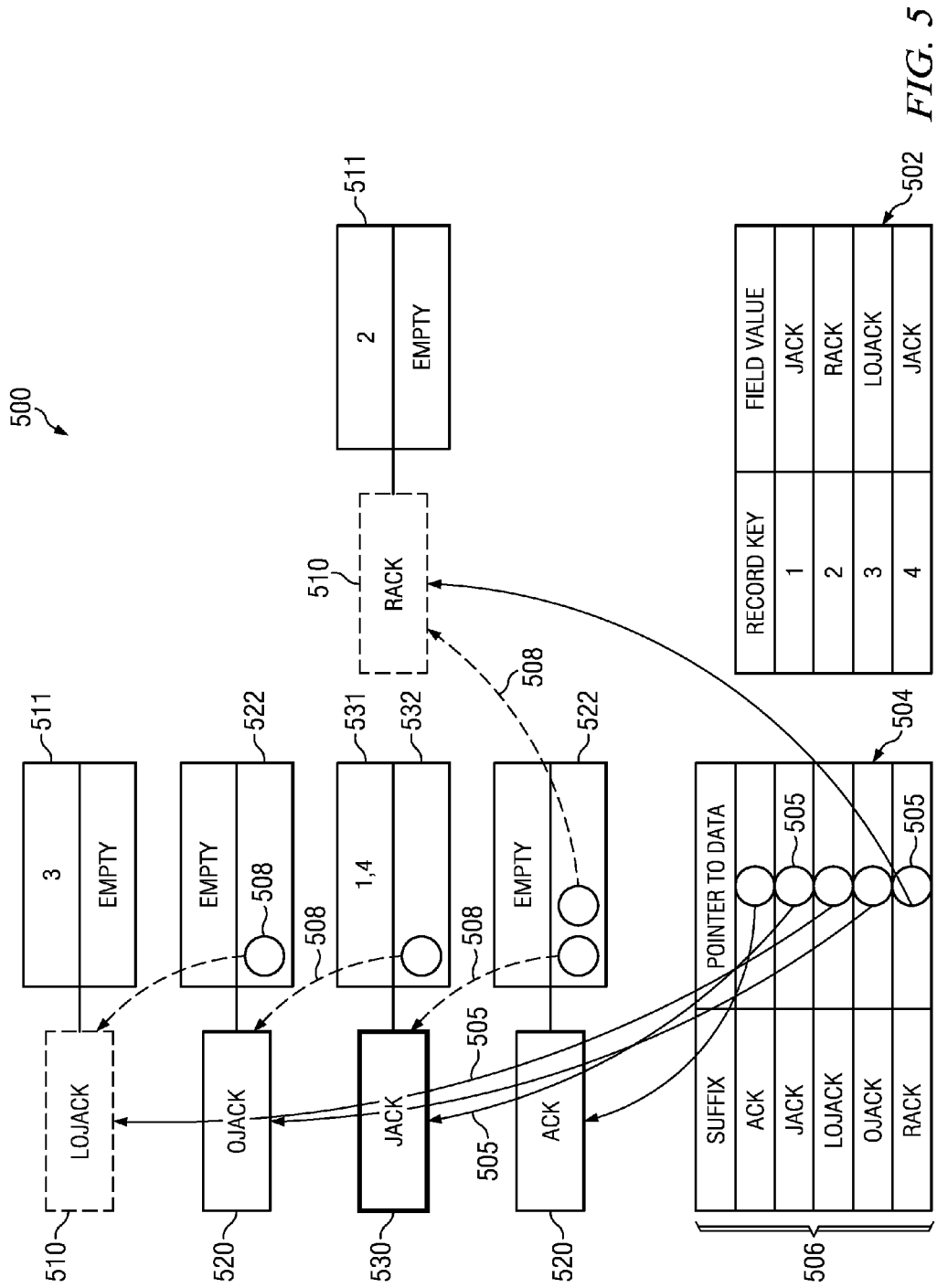
FIG. 5 is a schematic diagram illustrating an example index data structure for use in identifying a candidate subset of a structured or semi-structured data set, in accordance with the present disclosure.

FIG. 5 is a schematic diagram illustrating an example index data structure 500 for use in identifying a candidate subset of a structured or semi-structured data set 502. The structured and/or semi-structured data set 502 may exist in memory. The index data structure 500 may be derived from the data set 502. The index data structure 500 may be stored in memory. Each entry in index data structure 500 may contain a unigram sequence 506 that corresponds to suffixes of data field values from the data set 502, and may also contain record association data 504 that associates the unigram sequence with data set records that contain the unigram sequence 506. The unigram sequence 506 may be the length of the entire string in a data field (for example, for field value "JACK", the suffix may be "JACK") on down to a predetermined length (for example, for field value "JACK" and for a predetermined length of three, the suffixes would be "JACK" and "ACK"). The record association data 504 may comprise top-level data pointers 505. The top-level data pointers 505 may point to memory locations where further record association data for the unigram sequence resides. In some embodiments, unigram sequences 506 may correspond to main gram entries 510, suffix-only entries 520, or suffix/main gram combination entries 530.

Main gram entries 510 may include further record association data, such as a list of record keys 511 that identify data set records with data fields matching the unigram sequence. In this example, unigram sequences "LOJACK" and "RACK" are main grams in data set 502, because the third record has a data field "LOJACK" and the second record has a data field "RACK", and because no other record has a data field with suffixes "LOJACK" or "RACK". Entry "LOJACK" includes one record key identifying the third record in data set 502, and entry "RACK" includes one record key identifying the second record in data set 502.

Suffix-only entries 520 may include further record association data, such as a list 522 of suffix pointers 508 to indicate that the unigram sequence is the suffix of another gram stored in the data structure 500. In this example, unigram sequences "OJACK" and "ACK" are only suffixes in data set 502, because no record in data set 502 has a data field "OJACK" or "ACK". Entry "OJACK" includes one suffix pointer identifying entry "LOJACK", and entry "ACK" includes two suffix pointers: one suffix pointer identifying entry "JACK", and one suffix pointer identifying entry "RACK". In some embodiments, suffix pointers identify only those entries with one more unigram.

Suffix/main gram combination entries 530 may include further record association data, such as a list of record keys 531 that identify data set records with data fields matching the unigram sequence and a list 532 of suffix pointers 508 to indicate that the unigram sequence is the suffix of another gram stored in the data structure 500. In this example, unigram sequence "JACK" is a suffix/main gram combination in data set 502, because the first and fourth records each have a data field "JACK", and the third record has a data field with suffix "JACK". Entry "JACK" includes two record keys: one record key identifying the first record in data set 502, and one record key identifying the fourth record in data set 502. Entry "JACK" also includes one suffix pointer identifying entry "OJACK".

Figures 6, 7:
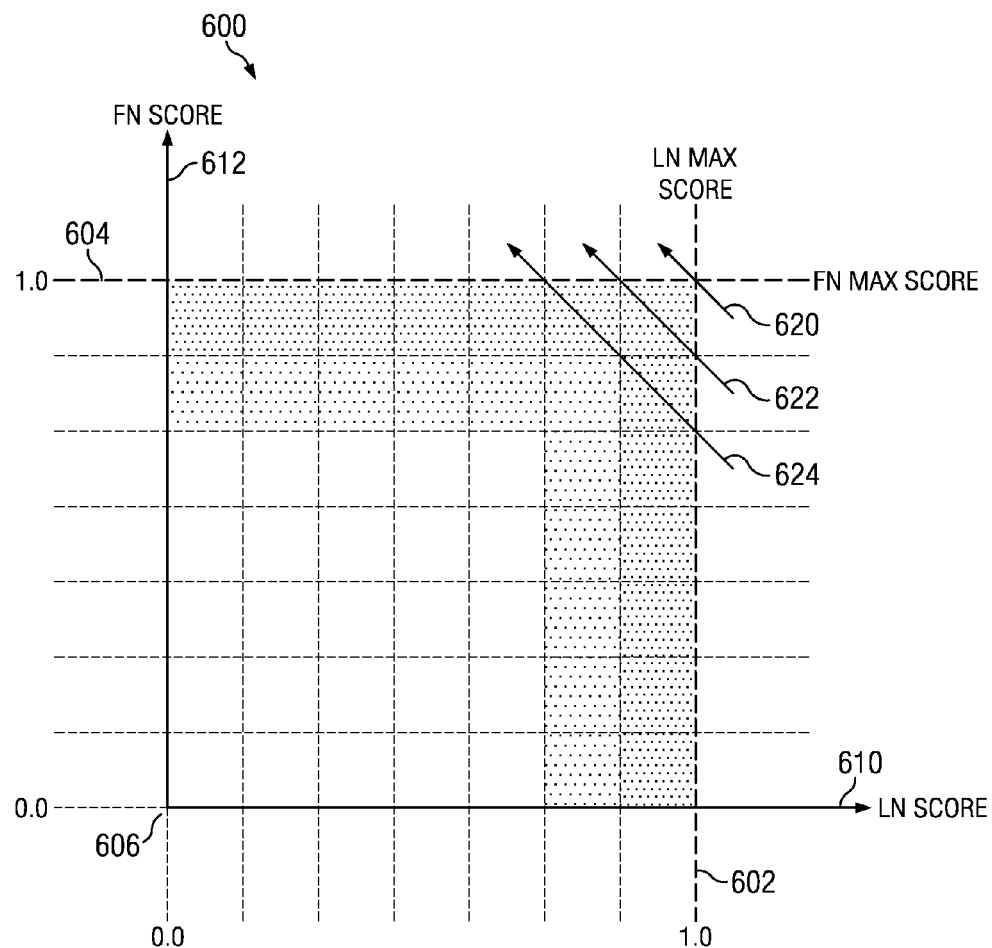
FIG. 6 is a graphical diagram illustrating an example similarity scoring system, in accordance with the present disclosure.
FIG. 7 is a schematic diagram illustrating circular grams, in accordance with the present disclosure.

FIG. 6 is a graphical diagram 600 illustrating an example similarity scoring system for data set records queried over two query fields, FN and LN, but may be generalized for any number of query fields. Data set records may be assigned a similarity score for both fields FN and LN of the query. Any appropriate model or algorithm may be used to calculate the similarity scores. The minimum possible score 606 (0.0 in this example) represents a complete non-match between the record's data field value and the query field value, and the maximum possible score 602, 604 (1.0 in this example) represents a complete match between the record's data field value and the query field value. Partial matches may be assigned a score between 0.0 and 1.0. A record's LN similarity scores may be plotted using the LN score for the x-axis 610 coordinate and using the FN score for the y-axis 612 coordinate.

In an example where FN=Barry and LN=Sanders, records in the data set for Barry Sanders may be plotted at (1.0, 1.0), records for Barry Taylor may be plotted at (0.0, 1.0), records for John Sanders may be plotted at (1.0, 0.0) and records for John Taylor may be plotted at (0.0, 0.0). Records for Larry Sanders may be plotted at (1.0, 0.9), records for Barry Flanders may be plotted at (0.9, 1.0), and records for Larry Flanders may be plotted at (0.9, 0.9). The scores assigned here are arbitrary and are for example purposes only.

In some embodiments, candidate generators as disclosed herein may identify data set records to the top and right of arrow 620 after a first iteration, may identify data set records to the top and right of arrow 622 after a second iteration, and may identify data set records to the top and right of arrow 624 after a third iteration.

Circular Grams

One challenge of gram-based scoring is that any slight error in the interior of a field may prevent several grams from matching. For example, if a query is "LIPATOR" and the field contains "LIPITOR," only two out of five possible trigrams (LIP and TOR) are shared with the query although query and field are only one character off (Note: if many records are found using the 7-gram "LIPITOR" it may not be necessary to look at trigrams.) But, in general, when using n-grams, an insert/deletion/substitution of a single symbol will affect up to n (partially overlapping) n-grams. Changing the order of two inner characters has an even more severe effect. Near the extremities of a short field, the effect of a variation is much less grave. The effect of orthographic variations is typically more severe at the beginning of a token (and occasionally the end, say Maria vs. Mario). The same goes for, say "PETER" vs. "PEDER." For example, 40 records with first name PEDER were found in a typical 7 million records real world data set.

Accordingly, circular grams (or wrapping grams) may be used to solve this issue. FIG. 7 is a table 700 illustrating the suffixes of "WILHELM" using a circular gram. In an embodiment, circular grams may be used with or instead of suffix grams both to determine the index data structure and to perform the candidate generation querying.

Use of Positional Information

The filtering chain of the present disclosure is based on subsequent refinement of the judgment of similarity. An additional benefit of using suffix arrays is that it allows positional information to be considered. Positional information may be kept for every occurrence when index data structures are generated based on the structured or semi-structured data. The positional information may be used when the query suffixes are generated from the query. In many cases using positional information may further refine the candidate selection, thus presenting better candidates to the following filter stages. Better candidates mean that less candidates are ultimately passed on to the later filter stages, reducing the computational overhead for the later filter stages.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

While TCP/IP communication protocols may be described herein, the coverage of the present application and any patents issuing there from may extend to other communications protocols.

Various terms used herein have special meanings within the present technical field. Whether a particular term should be construed as such a "term of art," depends on the context in which that term is used. "Connected to," "in communication with," "associated with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for identifying a candidate subset of a data set, the data set comprising a plurality of records structured with a data field, each record's data field comprising a data field value, the data field value comprising a sequence of one or more unigrams, the method comprising:
   recognizing a query field value, the query field value comprising a sequence of N unigrams beginning with $U_1$ and ending with $U_N$, wherein U symbolizes a unigram and N symbolizes a non-negative integer value; and
   performing a first step, a second step, a third step, and a fourth step of a candidate generation iterative loop, wherein
      the first step comprises identifying a query field value suffix comprising a sequence of N-J unigrams beginning with $U_{1+J}$ and ending with $U_N$, wherein J symbolizes a non-negative integer value less than N,
      the second step comprises identifying a qualifying subset of the data set, wherein each record in the qualifying subset satisfies a similarity criterion when the record's data field value is compared to the query field value suffix,
      the third step comprises including, in the candidate subset, the identified qualifying subset records, and
      the fourth step comprises, when the number of records in the candidate subset is less than a satisfactory number of candidates, and when N-J is greater than a minimum suffix length, incrementing J and performing the first step, the second step, the third step, and the fourth step of the candidate generation iterative loop;
   wherein the identifying the qualifying subset of the data set comprises accessing an index data structure derived from the data set, the index data structure comprising an index data structure entry for each data field value suffix of each record's data field value, each data field value suffix comprising a unigram sequence and associating the unigram sequence with one or more of the data set records;
   wherein the index data structure entry for each data field value suffix of each record's data field value further defining first, second, third, fourth, and fifth index data structure entries as follows:
      the first index data structure entry comprising a first-entry index unigram sequence, zero first-entry record keys, a first first-entry suffix pointer, and a second first-entry suffix pointer, the first first-entry suffix pointer identifying the second index data structure entry, and the second first-entry suffix pointer identifying the third index data structure entry;
      the second index data structure entry comprising a second-entry index unigram sequence, a first second-entry record key, a second second-entry record key, and a second-entry suffix pointer, the last unigrams of the second-entry index unigram sequence identical to the first-entry index unigram sequence, the first second-entry record key identifying a first record in the data set, the first record's data field value identical to the second-entry index unigram sequence, the second second-entry record key identifying a fourth record in the data set, the fourth record's data field value identical to the second-entry index unigram sequence, and the second-entry suffix pointer identifying the fourth index data structure entry;
      the third index data structure entry comprising a third-entry index unigram sequence, a third-entry record key, and zero third-entry suffix pointers, the last unigrams of the third-entry index unigram sequence identical to the first-entry index unigram sequence, and the third-entry record key identifying a second record in the data set, the second record's data field value identical to the third-entry index unigram sequence;
      the fourth index data structure entry comprising a fourth-entry index unigram sequence, zero fourth-entry record keys, and a fourth-entry suffix pointer, the last unigrams of the fourth-entry index unigram sequence identical to the second-entry index unigram sequence, and the fourth-entry suffix pointer identifying the fifth index data structure entry; and
      the fifth index data structure entry comprising a fifth-entry index unigram sequence, a fifth-entry record key, and zero fifth-entry suffix pointers, the last unigrams of the fifth-entry index unigram sequence identical to the fourth-entry index unigram sequence, and the fifth-entry record key identifying a third record in the data set, the third record's data field value identical to the fifth-entry index unigram sequence.

2. The method of claim 1, wherein prior to completing a first iteration of the candidate generation iterative loop, J is equal to zero and the query field value suffix is identical to the query field value.

3. The method of claim 1, wherein the data field value and the query field value each comprise a sequence of one or more graphemes.

4. The method of claim 3, wherein the sequence of one or more graphemes is selected from the group consisting of:
   a sequence of one or more alphabetic letters;
   a sequence of one or more alphanumeric characters;
   a sequence of one or more numerals; and
   a sequence of one or more Chinese characters.

5. The method of claim 1, wherein identifying the query field value suffix comprises generating the query field value suffix.

6. The method of claim 1, wherein identifying the query field value suffix comprises selecting the query field value suffix from a set of eligible query field value suffixes.

7. The method of claim 6, further comprising generating, prior to performing the first step of a first iteration of the candidate generation iterative loop, the set of eligible query field value suffixes.

8. The method of claim 7, wherein generating the set of eligible query field value suffixes comprises performing a first step, a second step, and a third step of a suffix generation iterative loop, wherein
   the first step comprises generating a suffix comprising a sequence of N-K unigrams beginning with $U_{1+K}$ and ending with $U_N$, wherein K symbolizes a non-negative integer value less than N,
   the second step comprises including, in the set of eligible query field value suffixes, the generated suffix, and
   the third step comprises, when N-K is greater than the minimum suffix length, incrementing K and performing the first step, the second step, and the third step of the suffix generation iterative loop.

9. The method of claim 8, wherein prior to completing a first iteration of the suffix generation iterative loop, K is equal to zero and the suffix is identical to the query field value.

10. The method of claim 1, wherein the data field value of each qualifying subset record comprises a sequence of unigrams identical to the query field value suffix.

11. The method of claim 10, wherein the data field value of a first qualifying subset record comprises a sequence of greater than N-J unigrams, and wherein the last N-J unigrams in the sequence are identical to the query field value suffix.

12. The method of claim 10, wherein the data field value of a first qualifying subset record comprises a sequence of greater than N-J unigrams, and wherein the first N-J unigrams in the sequence are identical to the query field value suffix.

13. The method of claim 1, wherein the data field value of each qualifying subset record is associated with a similarity score when compared to the query field value suffix, and wherein the similarity score satisfies a minimum similarity score criterion.

14. The method of claim 1, wherein identifying the qualifying subset of the data set comprises accessing an index data structure derived from the data set, the index data structure comprising a plurality of entries, each of the plurality of entries comprising a unigram sequence and associating the unigram sequence with one or more of the data set records.

15. The method of claim 14, wherein identifying the qualifying subset of the data set further comprises:
    identifying a matching entry in the index data structure, wherein the unigram sequence of the matching entry satisfies an index entry similarity criterion when compared to the query field value suffix; and
    including, in the qualifying subset of the data set, the one or more data set records associated with the unigram sequence of the matching entry.

16. The method of claim 15, wherein the unigram sequence of the matching entry is identical to the query field value suffix.

17. The method of claim 1, further comprising delivering the candidate subset to a filter process, wherein the filter process identifies a filtered subset of the candidate subset.

18. A method for identifying a candidate subset of a data set, the data set comprising a plurality of records structured with at least M data fields, M symbolizing a non-negative integer value, each of each record's at least M data fields comprising a data field value, the data field value comprising a sequence of one or more unigrams, the method comprising:
    recognizing M query field values, each of the M query field values associated with one of the at least M data fields, each of the M query field values comprising a sequence of N unigrams beginning with $U_1$ and ending with $U_N$, wherein U symbolizes a unigram and N symbolizes a non-negative integer value; and
    performing a first step, a second step, a third step, a fourth step, a fifth step, and a sixth step of a candidate generation iterative loop, wherein
        the first step comprises identifying, for each of the M query field values wherein N-J is greater than a minimum suffix length, a query field value suffix comprising a sequence of N-J unigrams beginning with $U_{1+J}$ and ending with $U_N$, wherein J symbolizes a non-negative integer value less than N,
        the second step comprises identifying a qualifying subset of the data set, wherein each record in the qualifying subset satisfies a similarity criterion when at least one of the identified query field value suffixes is compared to its associated data field value,
        the third step comprises determining a similarity score for each record in the qualifying subset,
        the fourth step comprises identifying a threshold subset of the qualifying subset, wherein the similarity score for each record in the threshold subset satisfies a threshold similarity score,
        the fifth step comprises including, in the candidate subset, each record in the threshold subset, and
        the sixth step comprises, when the number of records in the candidate subset is less than a satisfactory number of candidates, incrementing J and performing the first step, the second step, the third step, the fourth step, the fifth step, and the sixth step of the candidate generation iterative loop;
    wherein the identifying the qualifying subset of the data set comprises accessing an index data structure derived from the data set, the index data structure comprising an index data structure entry for each data field value suffix of each record's data field value, each data field value suffix comprising a unigram sequence and associating the unigram sequence with one or more of the data set records;
    wherein the index data structure entry for each data field value suffix of each record's data field value further defining first, second, third, fourth, and fifth index data structure entries as follows:
        the first index data structure entry comprising a first-entry index unigram sequence, zero first-entry record keys, a first first-entry suffix pointer, and a second first-entry suffix pointer, the first first-entry suffix pointer identifying the second index data structure entry, and the second first-entry suffix pointer identifying the third index data structure entry;
        the second index data structure entry comprising a second-entry index unigram sequence, a first second-entry record key, a second second-entry record key, and a second-entry suffix pointer, the last unigrams of the second-entry index unigram sequence identical to the first-entry index unigram sequence, the first second-entry record key identifying a first record in the data set, the first record's data field value identical to the second-entry index unigram sequence, the second second-entry record key identifying a fourth record in the data set, the fourth record's data field value identical to the second-entry index unigram sequence, and the second-entry suffix pointer identifying the fourth index data structure entry;
        the third index data structure entry comprising a third-entry index unigram sequence, a third-entry record key, and zero third-entry suffix pointers, the last unigrams of the third-entry index unigram sequence identical to the first-entry index unigram sequence, and the third-entry record key identifying a second record in the data set, the second record's data field value identical to the third-entry index unigram sequence;
        the fourth index data structure entry comprising a fourth-entry index unigram sequence, zero fourth-entry record keys, and a fourth-entry suffix pointer, the last unigrams of the fourth-entry index unigram sequence identical to the second-entry index unigram sequence, and the fourth-entry suffix pointer identifying the fifth index data structure entry; and
        the fifth index data structure entry comprising a fifth-entry index unigram sequence, a fifth-entry record key, and zero fifth-entry suffix pointers, the last unigrams of the fifth-entry index unigram sequence identical to the fourth-entry index unigram sequence, and the fifth-entry record key identifying a third record in the data set, the third record's data field value identical to the fifth-entry index unigram sequence.

19. The method of claim 18, wherein prior to completing a first iteration of the candidate generation iterative loop, J is equal to zero and for each of the M query field values, the M query field value suffix is identical to the M query field value.

20. The method of claim 18, wherein N is the same for each of the M query field values.

21. The method of claim 18, wherein identifying the query field value suffix comprises selecting the query field value suffix from a set of eligible query field value suffixes.

22. The method of claim 21, further comprising generating, prior to performing the first step of a first iteration of the candidate generation iterative loop, the set of eligible query field value suffixes for each of the M query field values.

23. The method of claim 18, wherein at least one data field value of each qualifying subset record comprises a sequence of unigrams identical to its associated query field value suffix.

24. The method of claim 18, wherein identifying the qualifying subset of the data set comprises accessing an index data structure, the index data structure comprising a plurality of entries, each of the plurality of entries comprising a unigram sequence and associating the unigram sequence with one or more data set records.

25. The method of claim 24, wherein identifying the qualifying subset of the data set further comprises:
   identifying a matching entry in the index data structure, wherein the unigram sequence of the matching entry satisfies an index entry similarity criterion when compared to the query field value suffix; and
   including, in the qualifying subset of the data set, the one or more data set records associated with the unigram sequence of the matching entry.

26. The method of claim 25, wherein the unigram sequence of the matching entry is identical to the query field value suffix.

27. A system for identifying a candidate subset of a data set, the data set comprising a plurality of records structured with a data field, each record's data field comprising a data field value, the data field value comprising a sequence of N unigrams beginning with $U_1$ and ending with $U_N$, wherein U symbolizes a unigram and N symbolizes a non-negative integer value, the system comprising:
   a processor operable to implement:
      an index data structure generator operable to derive an index data structure from the data set, wherein the index data structure comprises:
         an index data structure entry for each data field value suffix of each record's data field value, each data field value suffix comprising a sequence of N-J unigrams beginning with $U_{1+J}$ and ending with $U_N$, wherein J symbolizes each non-negative integer value less than N wherein N-J is greater than or equal to a minimum suffix length, wherein each index data structure entry comprises:
            an index unigram sequence identical to the data field value suffix; and
            record association data associating the index unigram sequence with at least one qualifying data set record, wherein the at least one qualifying data set record's data field value contains the index unigram sequence; and
         a candidate generator operable to use the index data structure to identify a candidate subset of the data set;
      the index data structure entry for each data field value suffix of each record's data field value further defining first, second, third, fourth, and fifth index data structure entries as follows:
         the first index data structure entry comprising a first-entry index unigram sequence, zero first-entry record keys, a first first-entry suffix pointer, and a second first-entry suffix pointer, the first first-entry suffix pointer identifying the second index data structure entry, and the second first-entry suffix pointer identifying the third index data structure entry;
         the second index data structure entry comprising a second-entry index unigram sequence, a first second-entry record key, a second second-entry record key, and a second-entry suffix pointer, the last unigrams of the second-entry index unigram sequence identical to the first-entry index unigram sequence, the first second-entry record key identifying a first record in the data set, the first record's data field value identical to the second-entry index unigram sequence, the second second-entry record key identifying a fourth record in the data set, the fourth record's data field value identical to the second-entry index unigram sequence, and the second-entry suffix pointer identifying the fourth index data structure entry;
         the third index data structure entry comprising a third-entry index unigram sequence, a third-entry record key, and zero third-entry suffix pointers, the last unigrams of the third-entry index unigram sequence identical to the first-entry index unigram sequence, and the third-entry record key identifying a second record in the data set, the second record's data field value identical to the third-entry index unigram sequence;
         the fourth index data structure entry comprising a fourth-entry index unigram sequence, zero fourth-entry record keys, and a fourth-entry suffix pointer, the last unigrams of the fourth-entry index unigram sequence identical to the second-entry index unigram sequence, and the fourth-entry suffix pointer identifying the fifth index data structure entry; and
         the fifth index data structure entry comprising a fifth-entry index unigram sequence, a fifth-entry record key, and zero fifth-entry suffix pointers, the last unigrams of the fifth-entry index unigram sequence identical to the fourth-entry index unigram sequence, and the fifth-entry record key identifying a third record in the data set, the third record's data field value identical to the fifth-entry index unigram sequence.

28. A system for identifying a candidate subset of a data set, the data set comprising a plurality of records structured with a data field, each record's data field comprising a data field value, the data field value comprising a sequence of one or more unigrams, the system comprising:
   an index data structure stored on one or more memory elements, the index data structure derived from the data set, the index data structure comprising a plurality of entries, each of the plurality of entries comprising an index unigram sequence and associating the index unigram sequence with one or more of the data set records; and
   a candidate generator implemented on one or more processors, the candidate generator for recognizing a query field value, the query field value comprising a sequence of N unigrams beginning with $U_1$ and ending with $U_N$, wherein U symbolizes a unigram and N symbolizes a non-negative integer value, the candidate generator also for performing a first step, a second step, a third step, and a fourth step of a candidate generation iterative loop, wherein
      the first step comprises identifying a query field value suffix comprising a sequence of N-J unigrams beginning with $U_{1+J}$ and ending with $U_N$, wherein J symbolizes a non-negative integer value less than N, the second step comprises identifying a qualifying subset of the data set, wherein each record in the qualifying subset satisfies a similarity criterion when the record's data field value is compared to the query field value suffix, and wherein identifying the qualifying subset comprises accessing the index data structure, the third step comprises including, in the candidate subset, the identified qualifying subset records, and the fourth step comprises, when the number of records in the candidate subset is less than a satisfactory number of candidates, and when N-J is greater than a minimum suffix length, incrementing J and performing the first step, the second step, the third step, and the fourth step of the candidate generation iterative loop;

wherein the index data structure entry for each data field value suffix of each record's data field value further defining first, second, third, fourth, and fifth index data structure entries as follows:

the first index data structure entry comprising a first-entry index unigram sequence, zero first-entry record keys, a first first-entry suffix pointer, and a second first-entry suffix pointer, the first first-entry suffix pointer identifying the second index data structure entry, and the second first-entry suffix pointer identifying the third index data structure entry;

the second index data structure entry comprising a second-entry index unigram sequence, a first second-entry record key, a second second-entry record key, and a second-entry suffix pointer, the last unigrams of the second-entry index unigram sequence identical to the first-entry index unigram sequence, the first second-entry record key identifying a first record in the data set, the first record's data field value identical to the second-entry index unigram sequence, the second second-entry record key identifying a fourth record in the data set, the fourth record's data field value identical to the second-entry index unigram sequence, and the second-entry suffix pointer identifying the fourth index data structure entry;

the third index data structure entry comprising a third-entry index unigram sequence, a third-entry record key, and zero third-entry suffix pointers, the last unigrams of the third-entry index unigram sequence identical to the first-entry index unigram sequence, and the third-entry record key identifying a second record in the data set, the second record's data field value identical to the third-entry index unigram sequence;

the fourth index data structure entry comprising a fourth-entry index unigram sequence, zero fourth-entry record keys, and a fourth-entry suffix pointer, the last unigrams of the fourth-entry index unigram sequence identical to the second-entry index unigram sequence, and the fourth-entry suffix pointer identifying the fifth index data structure entry; and the fifth index data structure entry comprising a fifth-entry index unigram sequence, a fifth-entry record key, and zero fifth-entry suffix pointers, the last unigrams of the fifth-entry index unigram sequence identical to the fourth-entry index unigram sequence, and the fifth-entry record key identifying a third record in the data set, the third record's data field value identical to the fifth-entry index unigram sequence.

29. The system of claim 28, wherein prior to completing a first iteration of the candidate generation iterative loop, J is equal to zero and the query field value suffix is identical to the query field value.

30. The system of claim 28, wherein identifying the query field value suffix comprises generating the query field value suffix.

31. The system of claim 28, wherein identifying the query field value suffix comprises selecting the query field value suffix from a set of eligible query field value suffixes.

32. The system of claim 31, wherein the candidate generator is further for generating, prior to performing the first step of a first iteration of the candidate generation iterative loop, the set of eligible query field value suffixes.

33. The system of claim 32, wherein generating the set of eligible query field value suffixes comprises performing a first step, a second step, and a third step of a suffix generation iterative loop, wherein the first step comprises generating a suffix comprising a sequence of N-K unigrams beginning with $U_{1+K}$ and ending with $U_N$, wherein K symbolizes a non-negative integer value less than N, the second step comprises including, in the set of eligible query field value suffixes, the generated suffix, and the third step comprises, when N-K is greater than the minimum suffix length, incrementing K and performing the first step, the second step, and the third step of the suffix generation iterative loop.

34. The system of claim 33, wherein prior to completing a first iteration of the suffix generation iterative loop, K is equal to zero and the suffix is identical to the query field value.

35. The system of claim 28, wherein the data field value of each qualifying subset record comprises a sequence of unigrams identical to the query field value suffix.

36. The system of claim 35, wherein the data field value of a first qualifying subset record comprises a sequence of greater than N-J unigrams, and wherein the last N-J unigrams in the sequence are identical to the query field value suffix.

37. The system of claim 35, wherein the data field value of a first qualifying subset record comprises a sequence of greater than N-J unigrams, and wherein the first N-J unigrams in the sequence are identical to the query field value suffix.

38. The system of claim 28, wherein the data field value of each qualifying subset record is associated with a similarity score when compared to the query field value suffix, and wherein the similarity score satisfies a minimum similarity score criterion.

39. The system of claim 28, wherein identifying the qualifying subset of the data set further comprises:

identifying a matching entry in the index data structure, wherein the unigram sequence of the matching entry satisfies an index entry similarity criterion when compared to the query field value suffix; and including, in the qualifying subset of the data set, the one or more data set records associated with the unigram sequence of the matching entry.

40. The system of claim 39, wherein the unigram sequence of the matching entry is identical to the query field value suffix.

41. The system of claim 28, wherein the candidate generator is further for delivering the candidate subset to a filter process, wherein the filter process identifies a filtered subset of the candidate subset.

42. The system of claim 28, wherein the candidate generator is further for modifying the recognized query field value prior to performing the first iteration of the candidate generation iterative loop.

43. The system of claim 42, wherein modifying the recognized query field value comprises:
  appending a unigram equal to $U_1$ to the query field value;
  removing $U_1$ from the query field value; and
  shifting the sequence of N unigrams to the left such that the unigram formerly in position $U_i$ is in position $U_{i-1}$.

44. The system of claim 28, further comprising:
  an index data structure generator implemented on the one or more processors, the index data structure generator for generating the index data structure.

45. A system for identifying a candidate subset of a data set, wherein the system comprises an index data structure generator operable to derive an index data structure from the data set, and a candidate generator operable to use the index data structure to identify a candidate subset of the data set, the data set comprising a plurality of records structured with a data field, each record's data field comprising a data field value, the data field value comprising a sequence of N unigrams beginning with $U_1$ and ending with $U_N$, wherein U symbolizes a unigram and N symbolizes a non-negative integer value, the index data structure comprising:
  an index data structure entry for each data field value suffix of each record's data field value, each data field value suffix comprising a sequence of N-J unigrams beginning with $U_{1+J}$ and ending with $U_N$, wherein J symbolizes each non-negative integer value less than N wherein N-J is greater than or equal to a minimum suffix length, wherein each index data structure entry comprises:
    an index unigram sequence identical to the data field value suffix; and
    record association data associating the index unigram sequence with at least one qualifying data set record, wherein the at least one qualifying data set record's data field value contains the index unigram sequence;
  wherein the record association data comprises:
    zero or more record keys, each record key identifying one of the qualifying data set records, wherein the one qualifying data set record's data field value is identical to the index unigram sequence; and
    zero or more suffix pointers, each suffix pointer identifying a related entry in the index data structure, the related entry's unigram sequence comprising N-J+1 unigrams, wherein the index unigram sequence is identical to the last N-J unigrams of the related entry's index unigram sequence;
  wherein a first index data structure entry comprises a first-entry index unigram sequence, zero first-entry record keys, a first first-entry suffix pointer, and a second first-entry suffix pointer, the first first-entry suffix pointer identifying a second index data structure entry, and the second first-entry suffix pointer identifying a third index data structure entry;
  wherein the second index data structure entry comprises a second-entry index unigram sequence, a first second-entry record key, a second second-entry record key, and a second-entry suffix pointer, the last unigrams of the second-entry index unigram sequence identical to the first-entry index unigram sequence, the first second-entry record key identifying a first record in the data set, the first record's data field value identical to the second-entry index unigram sequence, the second second-entry record key identifying a fourth record in the data set, the fourth record's data field value identical to the second-entry index unigram sequence, and the second-entry suffix pointer identifying a fourth index data structure entry;
  wherein the third index data structure entry comprises a third-entry index unigram sequence, a third-entry record key, and zero third-entry suffix pointers, the last unigrams of the third-entry index unigram sequence identical to the first-entry index unigram sequence, and the third-entry record key identifying a second record in the data set, the second record's data field value identical to the third-entry index unigram sequence;
  wherein the fourth index data structure entry comprises a fourth-entry index unigram sequence, zero fourth-entry record keys, and a fourth-entry suffix pointer, the last unigrams of the fourth-entry index unigram sequence identical to the second-entry index unigram sequence, and the fourth-entry suffix pointer identifying a fifth index data structure entry; and
  wherein the fifth index data structure entry comprises a fifth-entry index unigram sequence, a fifth-entry record key, and zero fifth-entry suffix pointers, the last unigrams of the fifth-entry index unigram sequence identical to the fourth-entry index unigram sequence, and the fifth-entry record key identifying a third record in the data set, the third record's data field value identical to the fifth-entry index unigram sequence.

* * * * *